Jan. 2, 1945.  M. R. EASTIN  2,366,500
TEMPERATURE CONTROL
Filed May 10, 1940  2 Sheets-Sheet 2

Inventor
Maurice R. Eastin
BY Williams, Bradbury & Hinkle
Attys.

Patented Jan. 2, 1945

2,366,500

UNITED STATES PATENT OFFICE 2,366,500

TEMPERATURE CONTROL

Maurice R. Eastin, North Tarrytown, N. Y., assignor to Minneapolis-Honeywell Regulator Company, Minneapolis, Minn., a corporation of Delaware Application May 10, 1940, Serial No. 334,363

41 Claims. (Cl. 257—3)

The present invention relates to improvements in temperature control and has for its primary object the provision of a new and improved control that is rugged in construction and simple and economical to install and to maintain in long-continued operation.

A further object of the present invention is to provide a new and improved control having a minimum of moving parts for controlling heating or cooling apparatus, or both, to maintain a desired temperature or temperatures within an enclosure.

A further object of the present invention is to provide a new and improved temperature control utilizing resistors having different temperature coefficients of resistance for effecting a differential temperature control of the temperature in an enclosure with respect to outdoor temperature.

A further object of the present invention is to provide a new and improved temperature control utilizing resistors having the same temperature coefficients of resistance for effecting a differential temperature control of the temperature in an enclosure with respect to outdoor temperature.

A further object of the present invention is to provide a new and improved temperature control whereby either a differential temperature control may be effected over the temperature in an enclosure with respect to outdoor temperature or the temperature may be maintained at a constant value and in which the differential between enclosure and outdoor temperature may be readily controlled.

A further object of the present invention is to provide a new and improved temperature control employing electronic devices whereby substantially all moving parts are eliminated from the control system.

Another object of the present invention is to provide a new and improved year-around temperature control.

A more specific object of the present invention is to provide a year-around temperature control wherein the temperature within an enclosure is (1) maintained at a predetermined differential with respect to the outdoor temperature when the outdoor temperature is above a predetermined value; (2) at a substantially constant value by either heating or cooling when the outdoor temperature is within a predetermined range lower than the aforesaid value; and (3) at a constant value by heating when the outdoor temperature is below the lower limit of the aforesaid range.

A further object of the present invention is to provide a temperature control wherein the control is effective periodically to test the temperature within the enclosure.

Another more specific object of the present invention is to provide an apparatus for periodically testing the temperature within the enclosure by periodically resetting the control at a neutral position, but which resetting does not affect the operation of the temperature changing means being utilized at the time unless the temperature within the enclosure is at the value at which it is to be maintained.

Other objects and advantages of the present invention will become apparent from the ensuing description, in the course of which reference is had to the accompanying drawings in which:

Fig. 4 is a schematic representation of a year-around temperature control adapted particularly for railway coaches and utilizing relays and a Wheatstone bridge arrangement comprising resistors having the same temperature coefficients of resistance.

Figure 1:
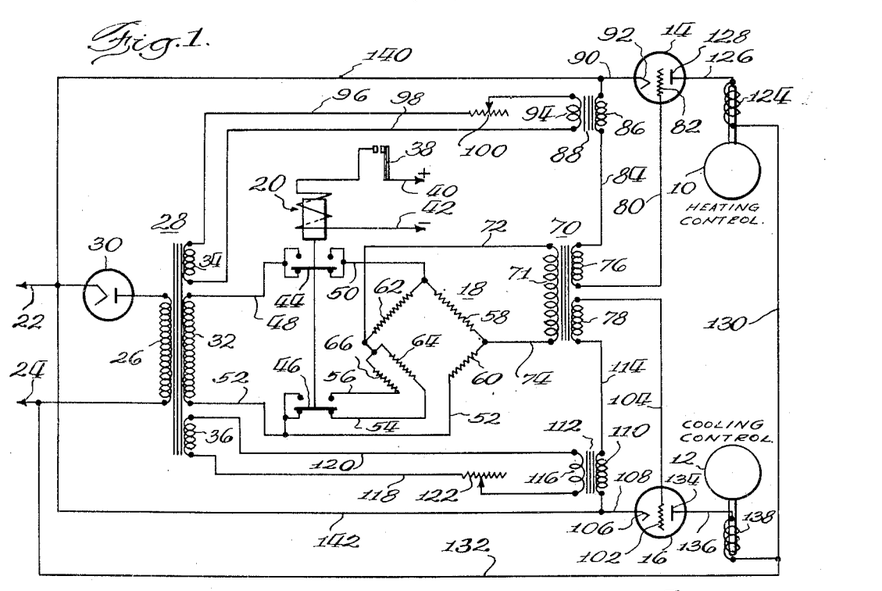
Fig. 1 is a schematic representation of a temperature control in which electronic means and a Wheatstone bridge arrangement comprising resistors having different temperature coefficients of resistance are utilized.

Referring now to Fig. 1, the temperature control illustrated therein comprises control devices 10 and 12, respectively, schematically indicated as being of the modulating type, but which may be of any desired type and are adapted to control temperature changing means of any desired type. The control device 10 controls heating apparatus and device 12 controls cooling apparatus. These control devices are controlled by electronic devices 14 and 16, respectively, the conductivity of which is controlled in response to temperature conditions within an enclosure by means including a Wheatstone bridge control circuit illustrated generally by reference character 18. The bridge circuit is adapted to be modified by means of a relay 20 to maintain either a constant temperature within the enclosure or a temperature that varies according to some desired ratio with respect to outdoor temperature in a manner more fully hereinafter to be described.

The control is supplied with suitable power, such, for instance, as 110 volts alternating current, through a pair of supply conductors 22 and 24. These conductors are connected to the primary winding 26 of a multiple winding transformer 28 through a half-wave rectifier so that the transformer primary is energized by pulsating uni-directional currents. This rectifier need not, however, be used. The bridge circuit is energized by a secondary winding 32 and voltages biasing the electronic control devices 14 and 16 to cut-off, i. e., before the voltages required to render them conductive, are applied to these devices through means including secondary windings 34 and 36, respectively, in a manner that will appear shortly.

The connections of the bridge circuit and relay 20 are indicated in the positions occupied thereby when the control is conditioned for maintaining a predetermined temperature differential between the enclosure and outdoor temperatures. At this time the relay 20 is deenergized by reason of the fact that the thermal responsive element 38, which is preferably located outdoors, is effective to break the energizing circuit for the delay. When the outdoor temperature decreases below a predetermined minimum value, the element 38 is effective to energize the relay and the latter is effective to modify the control circuit so that a constant temperature is maintained in the enclosure. The relay energizing circuit includes the conductors 40 and 42 which may be connected to a suitable source of power. The relay may be controlled manually instead of by the thermal responsive element, if desired.

The circuit modifying relay comprises a pair of contacts 44 and 46 normally interconnecting conductors 48 and 50 and 52 and 54, respectively, and operable upon energization of the relay to connect conductor 52 to a conductor 56 in place of conductor 54. Conductors 48 and 52, it may be noted, are connected across the terminals of secondary winding 32.

The bridge circuit comprises a pair of resistors 58 and 60 having substantially zero temperature coefficients of resistance and which may be mounted upon a control panel located within or in proximity to the enclosure, the temperature of which is to be controlled; a resistor 62 having a positive temperature coefficient of resistance and located within or otherwise made responsive to the temperature within the enclosure; a resistor 64 having a positive temperature coefficient of resistance, for example, about one-fourth as great as that of resistor 62 and located outdoors or otherwise made responsive to outdoor temperature; and a resistor 66 having a zero temperature coefficient of resistance and preferably, but not necessarily, located in proximity to resistor 64.

In order to utilize the unbalance of the bridge circuit resulting from changes in resistances of resistors 62 and 64, when these are both in the circuit, as they are when relay 20 is deenergized, or from changes in resistance of resistor 62, when resistor 66 is substituted for resistor 64, the various arms of the bridge circuit have substantially equal resistances at some standard of enclosure temperature. In the instant case it is assumed that this standard is 73° F. It should be understood that this value, as well as other temperature values referred to hereinafter, are illustrative and not limitative of the present invention. Then, when the relay 20 is deenergized, and if the temperature coefficient of resistance of resistor 64 is one-fourth that of resistor 62, the temperature in the enclosure is maintained at 73° F. as long as the outdoor temperature is 73° F. or less, as the outdoor temperature increases, the temperature maintained in the enclosure is automatically increased 1° F. for every 4° F. rise in outdoor temperature. This results from the fact that the bridge circuit is balanced when these conditions obtain. It should be noted, however, that the indicated ratio of the temperature coefficients of resistance is intended to be illustrative only and that the ratio may be varied to meet the requirements of specific installations.

When it is desirable to heat the enclosure and to maintain a constant temperature therein, as when the outdoor temperature falls below 73° F., the resistor 66 is substituted for resistor 64 in the bridge circuits. When this is done the bridge circuit is balanced only when the enclosure temperature is 73° F.

Returning now to a detailed description of the control, it may be noted that the junction of resistors 58 and 62 is connected to the previously mentioned conductor 50, and resistors 60, 64 and 66 are connected to the previously mentioned conductors 52, 54 and 56, respectively.

The bridge circuit is utilized selectively to render conductive the electronic devices 14 and 16 through a transformer 70, to the terminals of the primary winding 71 of which the bridge is connected by conductors 72 and 74, and having a pair of secondary windings 76 and 78 for applying positive potentials to the control electrodes of the electronic devices 14 and 16 and in proper relationship to the plate voltages thereof, respectively, when it is necessary either to heat or cool the enclosure to maintain the required temperature therein. Secondary winding 76 is connected by a conductor 80 to the control electrode 82 of electronic device 14 and by a conductor 84 to one terminal of the secondary winding 86 of a bias voltage transformer 88, the other terminal of which is connected by conductor 90 to the cathode 92 of the electronic device. The primary winding of transformer 88, which is indicated by reference character 94, is connected by conductors 96 and 98 to the previously mentioned secondary winding 34 of transformer 28. Conductor 96 has interposed therein means, such as an adjustable resistor 100, for the purpose of adjusting the bias voltage applied to the control electrode 82. Secondary winding 78 is similarly connected to electronic device 16, the control electrode 102 of the latter being connected to the winding by conductor 104, and the cathode 106 through conductor 108, secondary winding 110 of a bias voltage transformer 112, and conductor 114. The primary winding 116 of transformer 112 is connected by conductors 118 and 120 to secondary winding 36. Means, such as an adjustable resistance 122, is interposed in conductor 118 to regulate the bias applied to the control electrode 102.

The heating control device 10 is controlled by a coil 124 connected by conductor 126 to the anode 128 of electronic device 14 and through conductors 130 and 132 to power supply conductor 24. In similar manner the anode 134 of electronic device 16 is connected to the power supply conductor 24 through conductor 136, coil 138 controlling the cooling control device 12, and the previously mentioned conductor 132. The power supply circuits for the electronic devices 14 and 16 are completed by the conductors 140 and 142, respectively, which connect the cathodes of these devices to the power supply conductor 22.

In the description of the operation of the above described embodiment, it is assumed first that the conductors 22 and 24 are connected to a suitable source of alternating current and that the outdoor temperature is above 73° F. so that the relay 20 is deenergized and the circuit connections are, therefore, as indicated in the Fig. 1. The resistors 100 and 122 are so adjusted and the polarities of transformers 88 and 112 so arranged that the control electrodes 82 and 102 of control devices 14 and 16 are biased to cut-off, i. e., for balanced conditions the grids are supplied with voltages less than required to render them conductive and in proper phase relationship to the plate voltages. If the temperature within the enclosure is at the desired temperature, such, for instance, as 73° F., no current flows through the primary winding 71 of transformer 70 because of the balanced condition of the bridge circuit, and as a result the control devices 14 and 16 remain non-conductive and neither the heating nor cooling apparatus is operative.

When the temperature within the enclosure increases above 73° F., the result is an increase in the resistance of resistor 62 and unbalance of the bridge circuit, with the further result that an alternating current flows through the primary winding 71 of transformer 70 and voltages are induced in the secondary windings 76 and 78. These are so arranged in circuit with respect to electronic devices that control electrode 102 of electronic device 16 is made more positive with the result that it is rendered conductive and the cooling control operated to cool the enclosure at a rate dependent upon the current flow through the device. At the same time the control electrode 82 of device 14 remains non-conductive. If the outdoor temperature rises, say four degrees or to 77° F., then the enclosure temperature will be maintained at 74° rather than at 73° by reason of the difference in the temperature coefficients of resistance of resistors 62 and 64.

Should the indoor temperature fall below 73° F., the bridge again becomes unbalanced with the result that electronic device 14 is rendered conductive and the heating control rendered effective to raise the temperature within the enclosure until the bridge is balanced. It should be noted that operation of the heating apparatus is not dependent upon the energization of relay 20 although under normal conditions the indoor temperature will not be below 73° F. unless the outdoor temperature is below this value.

When the outdoor temperature falls below 73° F., relay 20 is energized and resistor 66 substituted for resistor 64 in the bridge circuit, and it should be apparent from the foregoing that the bridge will be balanced only when the temperature within the enclosure is 73° F. so that the heating or cooling controls will be selectively rendered operative to either heat or cool the temperature to maintain constant the temperature within the enclosure.

To provide a sensitive control the ratio of transformation between the primary and secondary windings of transformer 70 should be made high, and better to insure response to indoor or outdoor temperature variations, the resistors should have a high wattage capacity so that the heat generated by the flow of current therethrough will not be an appreciable factor in the control.

Figure 2:
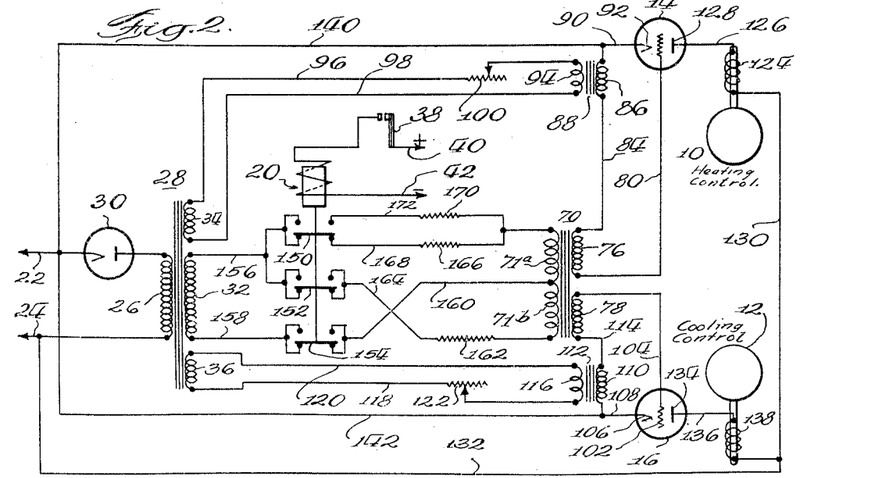
Fig. 2 is a schematic representation of an arrangement similar to that of Fig. 1 wherein a parallel circuit arrangement comprising resistors having different temperature coefficients of resistance are utilized.

The control illustrated in Fig. 2 differs from that described above primarily in that a parallel circuit arrangement has been substituted for the bridge circuit and the primary winding of transformer 70 has been modified slightly. In the description of this embodiment reference is, therefore, had only to the parallel circuit arrangement and transformer, and the remainder of the circuit is not described in detail although like parts have been indicated by like reference characters.

The relay 20 of the embodiment of Fig. 2 has associated therewith three contactors 150, 152 and 154, the first two of which are in circuit with conductor 156 connected to one terminal of secondary winding 32 and the last of which is in circuit with conductor 158 connected to the other terminal of this secondary winding. The primary winding 71 of transformer 70 is divided into two parts 71a and 71b by a center tap conductor 160 leading to contacts associated with contactor 154. The other terminal of winding 71b is connected through resistor 162 and conductor 164 to contacts associated with contactor 152 while the other terminal of winding 71a is connected either through resistor 166 and conductor 168 or resistor 170 and conductor 172 to contacts associated with contactor 150.

In the indicated position of the relay and its associated contactors, which corresponds to outdoor temperatures above 73° F., the resistor 166 is connected to winding 71a and resistor 162 is connected to winding 71b while the center point of the two windings is connected by conductor 160 to one terminal of transformer winding 32. It may be well to mention at this point that resistor 162 is the indoor resistor corresponding to the resistor 62 of the previously described embodiment and that resistors 166 and 170 are the outdoor resistors corresponding to resistors 64 and 66 of the previously described embodiment. When the temperature within the enclosure is at the predetermined value at which it is to be maintained (i. e., 73° F.), equal currents flow through the windings 71a and 71b in opposite directions with the result that no voltages are induced in the secondary windings 76 and 78, and with the further result that the control devices 14 and 16 remain non-conductive. However, when the indoor temperature rises above 73° F., the resistance of resistor 162 increases with the result that voltages are induced in the secondary windings. These windings are so connected that at this time the electronic device 16 is rendered conductive and the cooling apparatus effective to cool the enclosure just as in the previously described embodiment. The temperature coefficients of resistance of resistors 166 and 162 are designed to give the desired differential between indoor and outdoor temperatures as in the previously described embodiment.

When the outdoor temperature falls below 73° F., resistor 170 is substituted for resistor 166, and since resistor 170 has a zero temperature coefficient of resistance, a constant temperature of 73° F. is maintained within the enclosure.

As in the previous embodiment, either heating or cooling may take place irrespective of the circuit connections established by the relay 20.

In both of the embodiments described above the bridge is entirely disconnected from transformer winding 32 when a change-over from differential to constant temperature is effected by relay 20. This is desirable to avoid unnecessary unbalancing of the bridge circuit which might otherwise result if the relay 20 were utilized only to control the resistors 64 and 66 in the case of Fig. 1 or resistors 168 and 170 in the case of Fig. 2.

Figure 3:
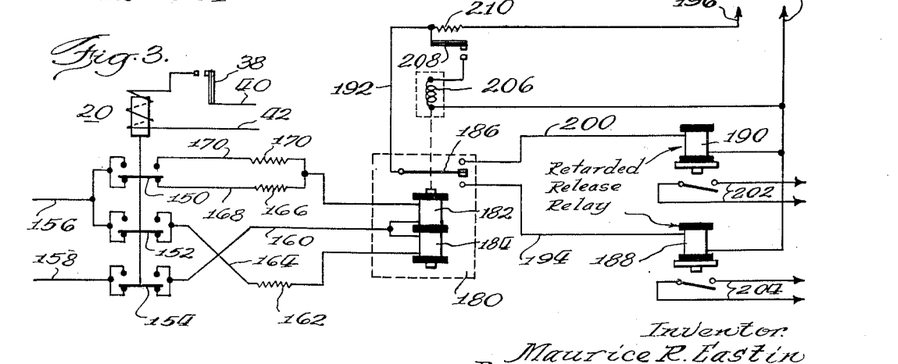
Fig. 3 is a schematic representation of an arrangement similar to that of Fig. 2 wherein relays are utilized in place of the electronic control means.

While it is preferred that the heating and cooling devices be controlled by electronic devices in the manner illustrated in the above-described embodiments of the present invention, other control devices may be utilized, as illustrated in Figs. 3 and 4.

Referring now to Fig. 3, it may be seen that the circuit arrangement insofar as the arrangement of the indoor and outdoor resistors is concerned is similar to that of Fig. 2. However, instead of utilizing electronic control devices and modulating type temperature control, a differential relay and on-off control of the temperature changing means have been illustrated. The differential relay is indicated as a whole by reference character 180. It comprises windings 182 and 184 connected in circuit in a manner identical to the connection of transformer windings 71a and 71b in the circuit of Fig. 2. Instead of utilizing alternating current, use is made of direct current and consequently the conductors 156 and 158 are to be connected to a source of direct current. The relay also comprises a movable contact 186 adapted selectively to complete energizing circuits for relays 188 and 190, depending upon the forces exerted by windings 182 and 184 as a result of the change in resistance of the indoor resistor 162 or outdoor resistors 166 or 170, as well as permanent magnets for effecting good contact.

When cooling is called for, movable contact 186 is actuated to complete a circuit between conductors 192 and 194 to energize the cooling apparatus control relay 188 by connecting it to supply conductors 196 and 198. When heating is called for, the movable contact is actuated to complete a circuit between conductors 192 and 200 to energize the heating apparatus control relay 190 by connecting it to the supply conductors. Relays 188 and 190 control the cooling and heating apparatus through circuits 202 and 204, respectively.

One of the features of the embodiment of Fig. 3 resides in periodically testing the temperature within the enclosure and in returning movable contact 186 to its neutral position. This is accomplished by periodically resetting movable contact blade 186 at its neutral position. To prevent periodic deenergization of relays 188 and 190 during the resetting when the enclosure temperature is not at the value at which it is to be maintained, the relays are provided with retarded release. The periodic resetting of contact 186 to its neutral position is effected by timing means which is illustrated as a thermal timer comprising a solenoid coil 206 periodically energized whenever either the heating or cooling apparatus is in opeartion by a bimetallic element 208 in proximity to a resistance type heater 210 in series with the power supply conductor 196. The thermal timer is so constructed and arranged with respect to the retardation of the relays 188 and 190 that these remain in circuit closing condition during the time the contact 186 is reset. As a result, the heating or cooling apparatus remains in continuous operation until the temperature within the enclosure is at the value at which it is to be maintained.

In operation, the control illustrated in Fig. 3 is quite similar to that of Fig. 2. When the outdoor temperature is above 73° F. the relay 20 is deenergized and the circuit connections are as indicated in the figure. The indoor resistor 162 is in series with winding 184 and the outdoor resistor 166 in series with winding 182. The resistance of each series circuit is designed to be equal at 73° F. so that when the enclosure temperature is at this value, windings 182 and 184 exert equal and opposite forces to maintain movable contact in its neutral position. The heating and cooling apparatus are, consequently, inoperative.

When the enclosure temperature rises above 73° F., the resistance of resistor 162 increases and the flow of current through winding 184 is reduced so that winding 182 is effective to actuate contact 186 to complete an energizing circuit for relay 188. The latter initiates and maintains in operation the cooling apparatus until the enclosure temperature is reduced to 73° F., or to a temperature below the outdoor temperature dependent upon the ratio of the temperature coefficients of resistance of resistors 162 and 166 and upon the outdoor temperature as explained heretofore. Under certain conditions, as upon a rapid rise in outdoor temperature, the heating means may be placed in operation by the control. The enclosure temperature is tested periodically, as at intervals of three minutes, by the thermal timer in the manner explained above.

When the outdoor temperature falls below 73° F., relay 20 is energized and the zero temperature coefficient of resistance resistor 170 is substituted for resistor 166. Thereafter, the enclosure is maintained at a constant temperature either by the heating or cooling apparatus.

A further embodiment of the present invention is illustrated in Fig. 4 in which the invention is shown in a year-around temperature control adapted particularly for railway coaches and the like. In this embodiment a somewhat different circuit arrangement of the indoor and outdoor resistors is illustrated, the indoor and outdoor resistors having the same temperature coefficients of resistance, but being so arranged that differential control is effected when the outdoor temperature is above a predetermined value. In this embodiment, like in the embodiment of Fig. 3, relays are utilized in place of electronic devices to control the temperature changing means.

Power is supplied to the control through a pair of conductors 220 and 222, the latter of which is connected to a manually operable control switch 224, provided for purposes that will be described in detail hereinafter, and indicated as being in an off position, but operable to connect the power supply conductor 222 to a conductor 226. The bridge circuit is indicated generally by reference character 230, and the relay controlling its connections by reference character 232. The bridge circuit has associated therewith a control relay 234 which may be a Weston 705 relay of the magnetic hold-in type provided with a solenoid reset indicated by reference character 236. The heating and cooling means are controlled, respectively, by relays 238 and 240 of the retarded release type described in conjunction with Fig. 3, and another relay 242 is provided to supply floor heat when desired.

The bridge circuit controlling relay 232 is adapted to be energized by a thermal responsive element 244, preferably located outdoors, whenever the outdoor temperature falls below 73° F. The relay has associated therewith a pair of contacts 246 and 248, the former of which is adapted to complete a circuit across conductors 250 and 252, and the latter of which is adapted to complete a circuit from conductor 254 to either conductor 256 or 258. The bridge circuit comprises resistors 260, 262, 264, 266, 268, 270 and 272. Conductor 252 is connected to the junction of resistors 260 and 262; conductor 258 is connected to resistor 270; conductor 256 is connected to resistor 268; conductor 254 to resistor 272, the junction of which and resistor 264 is connected by conductor 274 to supply conductor 226; and the junction of resistor 262 with resistors 268 and 270 and the junction of resistor 260 with resistor 266 are connected by conductors 276 and 278, respectively, to the terminals of the winding 280 of relay 234.

The resistor 262 is located in the enclosure within which the temperature is to be controlled, and resistors 268 and 270 are located outdoors. Resistors 262 and 268 have high temperature coefficients of resistance, while the remaining resistors have substantially zero temperature coefficients of resistance. The remaining resistors, namely, resistors 260, 264, 266 and 272, may be located upon a suitable control panel within or in proximity to the enclosure. The inside resistor 262 and resistor 260 may have resistances of 100 ohms at 73° F.; the resistor 264, a resistance of 400 ohms; the resistor 272, a resistance of 300 ohms; and the outdoor resistors 268 and 270 may have resistances of 100 ohms. The resistor 266 is provided for the purpose of adjustment of the bridge circuit. When the relay 232 is deenergized and the associated contacts thereof are in the positions indicated, a differential is maintained between the enclosure and outdoor temperatures. The enclosure temperature is maintained at 73° F. when the outdoor temperature is at 73° F., and when the outdoor temperature increases, the temperature maintained within the enclosure is raised one degree for every four degrees rise in outdoor temperature.

The floor heating circuit, which includes the previously mentioned relay 242, is controlled in part by a manually operable switch 282, adapted to complete a circuit from supply conductor 226 to a conductor 284 leading to a contact 286 operable upon energization of relay 242 to complete a circuit between the last-named conductor and a conductor 288 leading to a suitable control device (not illustrated) controlling the means for supplying floor heat. The energization of relay 242 is selectively controllable by thermostats 290 and 292 depending upon the position of a pressure switch 294 actuated in response to air pressure in the train brake pipe, indicated by reference character 296. One terminal of the relay winding is connected by conductor 298 to the power supply conductor 226, and the other by conductor 300 to contacts associated with switch 294. In the indicated position of the pressure switch, which position it occupies when the coach is in use, the switch 294 completes a circuit from conductor 300 to the other supply conductor 220 through the thermostat 290. This thermostat is arranged to complete the circuit whenever the temperature within the car is below 71° F. When the coach is not in use, the pressure switch is operable to complete a circuit from conductor 300 to the other supply conductor 220 through thermostat 292 which is arranged to complete a circuit whenever the temperature within the coach falls below 50° F., thereby to maintain a reduced temperature within the car.

The temperature changing means control relay 234 has associated therewith a movable contact 302 operable by coil 280 selectively to complete energizing circuits for the heating or cooling apparatus controlling relays 238 and 240 depending upon the unbalance of the bridge circuit. If the temperature conditions within the enclosure are such as to demand heating thereof, the contact 302 is effective to energize the heating apparatus controlling relay 238 by connecting it across the supply conductors 296 and 220 through a circuit including conductor 304, resistance heater 306 of the thermal timer 307, conductors 308, 310, and 312. The relay 238 comprises a movable switch member 314 operable upon energization of the relay to complete a circuit to the heating apparatus from power supply conductor 226 through a manually operable switch 316 (which is normally closed), conductors 318 and 320, a thermostat 322 provided for the purpose of preventing operation of the heating apparatus unless the outdoor temperature is below 70° F., and a conductor 324 leading to a suitable control for controlling the heating apparatus (not shown).

When the temperature conditions within the enclosure are such as to demand cooling of the air therewithin, the movable contact 302 is operable to complete a circuit for the energization of the cooling apparatus controlling relay 240. The energizing circuit for this relay includes the previously mentioned conductor 304, heater 306, and conductor 308 and conductors 326 and 328. The relay 240 comprises a movable switch member 330 operable upon energization of the relay to complete a circuit to the cooling control apparatus from power supply conductor 226 through conductor 332 and outdoor thermostat 334 arranged to close its associated circuit at outdoor temperatures above 64° F. and conductors 336 and 338. The outdoor thermostat 334 is provided to prevent operation of the cooling apparatus when the outdoor temperature is below 64° F.

The thermal timer 307 is operable periodically to reset the movable contact 302 which, as previously indicated, has associated therewith permanent magnets for holding it in circuit closing positions. The resetting of the contact is effected by the reset solenoid 236 which is periodically energized by the thermal timer through a circuit including the power supply conductor 226, a bimetallic element 340 in proximity to the heater 306, and conductors 342 and 344.

In order to reset relay 234 in its neutral position when the automatic control is placed in or out of operation, the selector switch 224 is arranged to complete an energizing circuit for solenoid 236 extending from the power supply conductor 222 through conductors 346 and 344 to the other power supply conductor 220. This resetting would not be necessary if the relay 232 did not have the previously described magnetic hold-in.

If it is necessary or desirable to operate the cooling apparatus, as, for instance, under emergency conditions when the control is inoperative, the selector switch 224 may be operated to complete a circuit from conductor 222 through conductor 350, and either directly for continuous operation or through an indoor thermostat 352 operable to complete the closure of the circuit at temperatures above 72° F., and the conductor 338. It may well be noted that if the selector switch is operated from its normal on position to the emergency cool position, the relay 234 is reset.

In the description of the operation, it is assumed first that the switches 282 and 316 are closed and that selector switch 224 has been operated to complete a connection between conductors 222 and 226 thereby to place the apparatus in condition for the automatic control of temperatures within an enclosure which may be, as previously indicated, a railway coach.

When the outdoor temperature is above 73° F., the temperature within the car is maintained at predetermined differentials with respect to the outdoor temperature by means of the bridge circuit and associated relays. If the ratio of the resistance of the indoor resistor 262 with respect to the resistor 260 is greater than the ratio of the resistances of outdoor resistor 268 plus resistor 272 with respect to resistor 264, then the bridge is unbalanced and the coil 280 of relay 234 is effective to complete an energizing circuit for relay 240, and the latter is effective to place the cooling apparatus in operation. If the two ratios are equal, then the bridge is balanced and the contact 302 remains in its neutral position. If the first-mentioned ratio is less than the second, then the movable contact 302 is effective to complete a circuit to the heating control relay 238, but the latter is prevented from placing the heating apparatus in operation because thermostat 322 is open at outdoor temperatures above 70° F.

The movable contact 302 is periodically reset by the periodic energization of the resetting solenoid 236 under the control of the thermal timer, just as in the case of the embodiment of Fig. 3.

When the temperature outdoors is at 73° F. or below, the zero temperature coefficient of resistance resistor 270 is substituted for resistor 268. When this is done, the bridge circuit is balanced only when the inside temperature is 73° F. When the outdoor temperature is in the range from 70° F. to 64° F., both heating and cooling may take place intermittently or alternately, as the case may be, to hold the car temperature at 73° F. However, when the outside temperature falls below 64° F., the energizing circuit for the cooling apparatus control is opened by thermostat 334 so that only the heating apparatus may be placed in operation.

When the outdoor temperature is between 70° F. and 73° F. the cooling apparatus is operable by the control to maintain the indoor temperature at 73° F.

Although the invention has been disclosed in connection with the specific details of preferred embodiments thereof, it should be understood that such details are not to be limitative of the invention except insofar as set forth in the accompanying claims.

I claim:

1. A temperature control for temperature changing means, including in combination, a circuit including a resistor having a predetermined temperature coefficient of resistance responsive to indoor temperature and a resistor having a different temperature coefficient of resistance responsive to outdoor temperature, and means responsive to the changes in resistance of said resistors in response to temperature variations for controlling the temperature changing means to maintain an indoor temperature dependent upon the outdoor temperature.

2. A temperature control for cooling apparatus, including in combination, a circuit including a first resistor having a predetermined temperature coefficient of resistance responsive to indoor temperature and a second resistor having a temperature coefficient of resistance a fraction of that of the first resistor and responsive to outdoor temperature, and means responsive to the changes in resistance of said resistors in response to temperature variations for controlling said cooling apparatus to maintain a differential between indoor and outdoor temperatures.

3. A temperature control for temperature changing means, including in combination, a bridge circuit comprising a pair of resistors having substantially the same temperature coefficients of resistance, one resistor being located in one leg of the bridge and being responsive to indoor and the other resistor being located in another leg of the bridge and being responsive to outdoor temperature, and other resistors constructed and arranged so that the bridge circuit is balanced at higher indoor temperatures in response to higher outdoor temperatures, and means controlled in response to the balance of said bridge circuit for controlling the temperature changing means.

4. A temperature control for temperature changing means, including in combination, means including a balanced circuit arrangement responsive to indoor and outdoor temperatures adapted to control the temperature changing means for maintaining a predetermined differential between indoor and outdoor temperatures, and means controlled in accordance with outdoor temperature and effective at a predetermined outdoor temperature to modify said circuit for making it responsive to indoor temperature and for maintaining a constant indoor temperature.

5. A temperature control for temperature changing means, including in combination, means including a balanced circuit arrangement comprising resistors responsive to indoor and outdoor temperatures adapted to control the temperature changing means for maintaining a predetermined differential between indoor and outdoor temperatures, means including a relay and contacts associated therewith for modifying said circuit to make it responsive to indoor temperatures for maintaining a constant indoor temperature, and means including thermal responsive means responsive to outdoor temperatures for controlling said relay.

6. A temperature control for temperature changing means, including in combination, a balanced circuit comprising differentially energized windings and resistance means in series with each of said windings, one of said resistance means being responsive to indoor temperature and having a predetermined temperature coefficient of resistance, the other of said resistance means being responsive to outdoor temperature and having a temperature coefficient of resistance a fraction of that of the first, whereby a temperature differential may be maintained between indoor and outdoor temperatures, resistance means having a negligible temperature coefficient of resistance adapted to be substituted for the resistance means responsive to outdoor temperature, whereby a substantially constant temperature may be maintained indoors, means for substituting the last-mentioned resistance means for the said other resistance means, and means controlled in response to the balance of said circuit for controlling the temperature changing means.

7. A temperature control for temperature changing means, including in combination, a bridge circuit comprising a pair of resistors having substantially the same temperature coefficients of resistance, one responsive to indoor and the other to outdoor temperatures, and other resistors having substantially zero temperature coefficients of resistance arranged so that the bridge circuit is balanced at different indoor temperatures in response to varying outdoor temperatures, resistance means having a negligible temperature coefficient of resistance adapted to be substituted for the resistance means responsive to outdoor temperature in said bridge circuit and arranged so that the bridge circuit is balanced at a substantially constant indoor temperature, means for effecting the substitution of the last-mentioned resistance means for the outdoor temperature responsive resistance means, and means controlled in response to the balance of said bridge circuit for controlling the temperature changing means.

8. A temperature control, including in combination, a source of alternating current, a bridge circuit connected across said source, said bridge circuit including a resistor responsive to indoor temperature and having a predetermined temperature coefficient of resistance, a second resistor responsive to outdoor temperature and having a lesser temperature coefficient of resistance, and other resistors having negligible temperature coefficients of resistance arranged so that the circuit is balanced at different indoor temperatures in response to varying outdoor temperatures, a transformer comprising a primary winding and a pair of secondary windings, said primary winding being connected to said bridge circuit in such manner that it is supplied with voltage when the circuit is unbalanced, a pair of electronic devices comprising cathodes, anodes and control electrodes, the control electrodes and cathodes of each of said devices being connected in circuit with one of said secondary windings, means for biasing said electronic devices to cut-off, said means including secondary windings in series with each of the first-mentioned secondary windings and supplied with current from said source, said first-mentioned secondary windings being so arranged with respect to the second-mentioned secondary windings that the tubes are selectively rendered conductive upon a deviation of the indoor temperature from a value at which the bridge circuit is balanced, heating means controlled by one of said electronic devices, and cooling means controlled by the other of said electronic devices.

9. A temperature control, including in combination, a source of alternating current, a bridge circuit connected across said source, said bridge circuit including a resistor responsive to indoor temperature and having a predetermined temperature coefficient of resistance, a second resistor responsive to outdoor temperature and having a lesser temperature coefficient of resistance, and other resistors having negligible temperature coefficients of resistance arranged so that the circuit is balanced at different indoor temperatures in response to varying outdoor temperatures, a resistor having a negligible temperature coefficient of resistance adapted to be substituted for said second resistor, means responsive to outdoor temperature for effecting the substitution, a transformer comprising a primary winding and a pair of secondary windings, said primary winding being connected to said bridge circuit in such manner that it is supplied with voltage when the circuit is unbalanced, a pair of electronic devices comprising cathodes, anodes and control electrodes, the control electrodes and cathodes of each of said devices being connected in circuit with one of said secondary windings, means for biasing said electronic devices to cut-off, said means including secondary windings in series with each of the first-mentioned secondary windings and supplied with current from said source, said first-mentioned secondary windings being so arranged with respect to the second-mentioned secondary windings that the tubes are selectively rendered conductive upon a deviation of the indoor temperature from a value at which the bridge circuit is balanced, heating means controlled by one of said electronic devices, and cooling means controlled by the other of said electronic devices.

10. A temperature control, including in combination, a source of alternating current, a normally balanced circuit connected across said source, said circuit including a resistor responsive to indoor temperature and having a predetermined temperature coefficient of resistance and a transformer having a primary winding comprised of two opposed portions and a pair of secondary windings, said resistor being connected in series with one portion of said primary winding, a second resistor responsive to outdoor temperature and having a temperature coefficient of resistance a fraction of that of the first, whereby the circuit is balanced at different indoor temperatures in response to varying outdoor temperatures and voltages of one polarity are induced in said secondary windings when the indoor temperature is above a value at which the circuit is balanced and of the opposite polarity when the indoor temperature is below the value at which the circuit is balanced, a pair of electronic devices comprising cathodes, anodes and control electrodes, the control electrodes and cathodes of each of said devices being connected in circuit with one of said secondary windings, means for biasing said electronic devices to cut-off, said means including secondary windings in series with each of the first-mentioned secondary windings and supplied with current from said source, said first-mentioned secondary windings being so arranged with respect to the second-mentioned secondary windings that the tubes are selectively rendered conductive upon a deviation of the indoor temperature from a value at which the bridge circuit is balanced, heating means controlled by one of said electronic devices, and cooling means controlled by the other of said electronic devices.

11. A temperature control, including in combination, a source of alternating current, a normally balanced circuit connected across said source, said circuit including a resistor responsive to indoor temperature and having a predetermined temperature coefficient of resistance and a transformer having a primary winding comprised of two opposed portions and a pair of secondary windings, said resistor being connected in series with one portion of said primary winding, a second resistor responsive to outdoor temperature and having a temperature coefficient of resistance a fraction of that of the first, whereby the circuit is balanced at different indoor temperatures in response to varying outdoor temperatures and voltages of one polarity are induced in said secondary windings when the indoor temperature is above a value at which the circuit is balanced and of the opposite polarity when the indoor temperature is below the value at which the circuit is balanced, a resistor having a negligible temperature coefficient of resistance adapted to be substituted for said second resistor, whereby said circuit is balanced at a predetermined constant indoor temperature, means responsive to outdoor temperature for effecting the substitution, a pair of electronic devices comprising cathodes, anodes and control electrodes, the control electrodes and cathodes of each of said devices being connected in circuit with one of said secondary windings, means for biasing said electronic devices to cut-off, said means including secondary windings in series with each of the first-mentioned secondary windings and supplied with current from said source, said first-mentioned secondary windings being so arranged with respect to the second-mentioned secondary windings that the tubes are selectively rendered conductive upon a deviation of the indoor temperature from a value at which the bridge circuit is balanced, heating means controlled by one of said electronic devices, and cooling means controlled by the other of said electronic devices.

12. A control for temperature changing means, including in combination, means including a relay of the retarded release type for controlling the operation of the temperature changing means, means including a member movable from a normal to a displaced position for energizing said relay, and means set into operation upon the energization of said relay for periodically returning said movable member to its normal position for a length of time less than the time of retardation of said relay.

13. A control for temperature changing means, including in combination, means including a relay of the retarded release type for controlling the operation of the temperature changing means, means including a member movable from a normal to a displaced position for energizing said relay, and means set into operation upon the energization of said relay for periodically returning said movable member to its normal position for a length of time less than the time of retardation of said relay, said last-mentioned means comprising a relay operatively associated with said movable member, a heater in the energizing circuit for said first-mentioned relay, and a bimetallic element in proximity thereto for intermittently energizing said last-mentioned relay.

14. A temperature control for temperature changing means, including in combination, a balanced circuit comprising a relay having opposed windings and resistors in series with each of said windings, one of said resistors being responsive to indoor temperature and having a predetermined temperature coefficient of resistance, and the other being responsive to outdoor temperature and having a temperature coefficient of resistance a fraction of that of the first, whereby said relay is operable into different positions in response to temperature variations, and temperature changing means controlled by said relay.

15. A temperature control for heating and cooling apparatus, including in combination, a circuit comprising a relay having opposed windings and resistors in series with each of said windings, said circuit being balanced at a predetermined temperature and one of said resistors being responsive to indoor temperature and having a predetermined temperature coefficient of resistance, and the other being responsive to outdoor temperature and having a temperature coefficient of resistance a fraction of that of the first, whereby said circuit is balanced at different indoor temperatures in response to changes in outdoor temperatures, a resistor having a substantially zero temperature coefficient of resistance adapted to be substituted in said circuit in place of said other resistor and having a value such that the circuit is balanced at a predetermined constant indoor temperature, means for substituting said resistor in said circuit, and means operable by said relay for controlling said heating and cooling apparatus.

16. A temperature control for heating and cooling apparatus, including in combination, a circuit comprising a relay having opposed windings and resistors in series with each of said windings, said circuit being balanced at a predetermined temperature and one of said resistors being responsive to indoor temperature and having a predetermined temperature coefficient of resistance, and the other being responsive to outdoor temperature and having a temperature coefficient of resistance a fraction of that of the first, whereby said circuit is balanced at different indoor temperatures in response to changes in outdoor temperatures, a resistor having a substantially zero temperature coefficient of resistance adapted to be substituted in said circuit in place of said other resistor and having a value such that the circuit is balanced at a predetermined constant indoor temperature, means for substituting said resistor in said circuit, and means operable by said relay for controlling said heating and cooling apparatus, said last-mentioned means including a switch movable by said relay from a normal to a pair of displaced positions, a pair of relays of the retarded release type selectively energizable by said switch for controlling the heating and cooling apparatus, respectively, and electro-thermal timing means set into operation upon energization of either of said last-mentioned relays for periodically returning said switch member to its normal position for a length of time less than the time of retardation of said relays.

17. A temperature control for temperature changing means, including in combination, a bridge circuit comprising a pair of resistors having substantially the same temperature coefficients of resistance, one located in one leg of the bridge and being responsive to indoor and the other located in the other leg of the bridge and being responsive to outdoor temperature, and other resistors constructed and arranged so that the bridge circuit is balanced at higher indoor temperatures in response to higher outdoor temperatures, a relay comprising a winding oppositely energized in response to unbalance of the bridge circuit and a switch operable from a normal to a pair of displaced positions, and means rendered effective upon operation of said switch into its displaced positions for controlling said temperature changing means.

18. A temperature control for temperature changing means, including in combination, a bridge circuit comprising a pair of resistors having substantially the same temperature coefficients of resistance, one responsive to indoor and the other to outdoor temperature, and other resistors constructed and arranged so that the bridge circuit is balanced at different indoor temperatures in response to varying outdoor temperatures, a relay comprising a winding oppositely energized in response to unbalance of the bridge circuit and a switch operable from a normal to a pair of displaced positions, and means rendered effective upon operation of said switch into its displaced positions for controlling said temperature changing means, said last-mentioned means including a relay of the retarded release type energizable by the switch, and an electro-thermal timer for periodically returning said switch to its normal position for a length of time less than the retardation time of said second-mentioned relay.

19. A temperature control for heating and cooling apparatus, including in combination, a bridge circuit comprising a pair of resistors having the same relatively large temperature coefficients of resistance, one responsive to indoor and the other to outdoor temperature, and other resistors having negligible temperature coefficients of resistance arranged so that the circuit is balanced at different indoor temperatures in response to varying outdoor temperatures, a resistor having a negligible temperature coefficient of resistance adapted to be substituted for said other resistor so arranged that the circuit is balanced at a predetermined indoor temperature, means responsive to outdoor temperature for effecting the substitution of said last-mentioned resistor for said other resistor, a relay comprising a winding oppositely energized in response to the unbalance of said bridge circuit and a switch operable from a normal to a pair of displaced positions, means rendered effective upon operation of said switch into one of its displaced positions for placing said heating apparatus in operation, and means effective upon operation of said switch to its other displaced position for placing said cooling apparatus in operation.

20. A temperature control for heating and cooling apparatus, including in combination, a bridge circuit comprising a pair of resistors having the same relatively large temperature coefficients of resistance, one responsive to indoor and the other to outdoor temperature, and other resistors having negligible temperature coefficients of resistance arranged so that the circuit is balanced at different indoor temperatures in reponse to varying outdoor temperatures, a resistor having a negligible temperature coefficient of resistance adapted to be substituted for said other resistor so arranged that the circuit is balanced at a predetermined indoor temperature, means responsive to outdoor temperature for effecting the substitution of said last-mentioned resistor for said other resistor, a relay comprising a winding oppositely energized in response to the unbalance of said bridge circuit and a switch operable from a normal to a pair of displaced positions, means rendered effective upon operation of said switch into one of its displaced positions for placing said heating apparatus in operation, and means effective upon operation of said switch to its other displaced position for placing said cooling apparatus in operation, each of the two last-mentioned means including relays of the retarded release type selectively energizable by said switch and an electro-thermal timer in circuit with said relays for periodically returning said switch to its normal position for a length of time less than the retardation time of said second-mentioned relays.

21. A temperature control for heating and cooling apparatus, including in combination, a bridge circuit comprising a pair of resistors having the same relatively large temperature coefficients of resistance, one responsive to indoor and the other to outdoor temperature, and other resistors having negligible temperature coefficients of resistance arranged so that the circuit is balanced at different indoor temperatures in response to varying outdoor temperatures, a resistor having a negligible temperature coefficient of resistance adapted to be substituted for said other resistor so arranged that the circuit is balanced at a predetermined indoor temperature, means responsive to outdoor temperature for effecting the substitution of said last-mentioned resistor for said other resistor, a relay comprising a winding oppositely energized in response to the unbalance of said bridge circuit and a switch operable from a normal to a pair of displaced positions, means rendered effective upon operation of said switch into one of its displaced positions for placing said heating apparatus in operation, means effective upon operation of said switch to its other displaced position for placing said cooling apparatus in operation, means responsive to outdoor temperature for preventing operation of the heating apparatus above a predetermined outdoor temperature, and means responsive to outdoor temperature for preventing operation of the cooling apparatus below a second and lower predetermined outdoor temperature.

22. In a temperature control for heating and cooling apparatus, the combination including, means including indoor and outdoor temperature responsive means and heating and cooling apparatus operation control means for maintaining a predetermined differential between indoor and outdoor temperatures, means responsive to outdoor temperature for modifying outdoor temperature responsive means to render said first-mentioned means effective to maintain a constant indoor temperature, means responsive to outdoor temperature for preventing operating of the heating means when the outdoor temperature rises above a predetermined value, and other means responsive to outdoor temperature for preventing operation of the cooling means when the outdoor temperature falls below a predetermined lower value.

23. In a temperature control for heating and cooling apparatus, the combination including, means responsive to the temperature within an enclosure adapted selectively to place the heating and cooling apparatus in operation when the outdoor temperature is within a predetermined range, outdoor temperature responsive means for preventing operation of the cooling means when the outdoor temperature is below said range, and outdoor temperature responsive means for preventing operation of the heating means when the outdoor temperature is above said range.

24. In a temperature control for heating and cooling apparatus, the combination including, heating apparatus operation controlling means, cooling apparatus operation controlling means, means including a circuit balanced at a predetermined indoor temperature for selectively energizing said heating and cooling apparatus operation controlling means for maintaining said predetermined temperature indoors when the outdoor temperature is within a predetermined range below said predetermined temperature, means responsive to outdoor temperature for preventing operation of said cooling means when the outdoor temperature is below said range, means responsive to outdoor temperature for preventing operation of the heating means when the outdoor temperature is above the upper limit of said range, and means responsive to outdoor temperature adapted to modify said circuit so that it is balanced at an indoor temperature that increases with increasing outdoor temperatures when the outdoor temperature is above said predetermined value.

25. In a temperature control for heating and cooling apparatus, the combination including, heating apparatus operation controlling means, cooling apparatus operation controlling means, means including a circuit balanced at a predetermined indoor temperature for selectively energizing said heating and cooling apparatus operation controlling means for maintaining said predetermined temperature indoors when the outdoor temperature is within a predetermined range below said predetermined temperature, means responsive to outdoor temperature for preventing operation of said cooling means when the outdoor temperature is below said range, means responsive to outdoor temperature for preventing operation of the heating means when the outdoor temperature is above the upper limit of said range, means responsive to outdoor temperature adapted to modify said circuit so that it is balanced at an indoor temperature that increases with increasing outdoor temperatures when the outdoor temperature is above said predetermined value, and means including a manual selector switch for placing said cooling apparatus in operation independently of said control.

26. A control for temperature changing means, including in combination, means including a relay of the retarded release type for controlling the operation of the temperature changing means, means including a member movable from a normal to a displaced position for energizing said relay, means set into operation upon the energization of said relay for periodically returning said movable member to its normal position for a length of time less than the time of retardation of said relay, and means operable independently of said last-mentioned means for returning said member to its normal position.

27. A control for temperature changing means, including in combination, means including a member operable from a neutral into a displaced position in response to temperature variations for controlling said temperature changing means, means operable periodically for returning said member to its neutral position, and selector means for rendering said first-mentioned means ineffective to control said temperature changing means, said selector means having associated therewith means for returning said member to its neutral position when it is operated to render ineffective said first-mentioned means.

28. A temperature control including in combination, a source of alternating current, balanced circuit means including a resistor responsive to indoor temperature and a resistor responsive to outdoor temperature adapted to balance said circuit means at different indoor temperatures in response to different outdoor temperatures, a transformer having a primary winding connected to said balanced circuit means and a pair of secondary windings wherein voltages are induced wherein said balanced circuit means is unbalanced, a pair of electronic devices comprising cathodes, anodes and control electrodes, the control electrodes and cathodes of each of said devices being connected in circuit with one of said secondary windings, means for biasing said electronic devices to cut-off, said means including secondary windings in series with each of the first-mentioned secondary windings and supplied with current from said source, said first-mentioned secondary windings being so arranged with respect to the second-mentioned secondary windings that the devices are selectively rendered conductive upon a deviation of the indoor temperature from a value at which the circuit means is balanced, heating means controlled by one of said electronic devices, and cooling means controlled by the other of said electronic devices.

29. A system for controlling condition changing means, comprising in combination, an electrical bridge circuit including a plurality of resistances each variable in accordance with the magnitude of one of a group of controlling conditions, means associated with at least one of said variable resistances including a substantially constant resistance and switch means responsive to the controlling condition corresponding to said one variable resistance for removing said one resistance from the bridge circuit and substituting said constant resistance therein when said controlling condition departs from a predetermined range of values, and means responsive to unbalance of said bridge circuit for controlling said condition changing means.

30. In combination, means having a variable output for changing the temperature of a space, an electrical bridge circuit, a first resistance element in said circuit having an appreciable temperature coefficient of resistance and exposed to the temperature of said space, a second resistance element variable in accordance with the magnitude of a condition indicative of a need for a change in the relationship between said space temperature and the output of said temperature changing means, a third resistance element of substantially constant value, means responsive to said last mentioned condition for connecting said second element in said bridge circuit when the value of said condition lies within a predetermined range, and for connecting said third element in said circuit when said condition lies without said range, and means responsive to the unbalance of said bridge circuit for controlling the output of said temperature changing means.

31. In a system for controlling the temperature of a space, cooling means, an electrical bridge circuit, a first resistance element in said circuit having an appreciable temperature coefficient of resistance and exposed to the temperature of said space, a second resistance element having an appreciable temperature coefficient of resistance and exposed to outdoor temperature, a third resistance element of substantially constant value, switch means for selectively connecting said second and third elements in said circuit, thermostatic means for operating said switch so as to connect said second element in said circuit when the outdoor temperature is above a predetermined value, and means responsive to the unbalance of said bridge circuit for controlling said cooling means.

32. In a system for controlling the temperature of a space, cooling means, an electrical bridge circuit, means responsive to unbalance of said bridge circuit for controlling said cooling means, means including a first resistance element responsive to said space temperature for unbalancing said bridge circuit upon a change in said space temperature, means including a second resistance element responsive to outdoor temperature for compensating the action of said bridge circuit, a third resistance element of substantially constant value equal to that of said second element when said outdoor temperature is at a critical value, and thermostatic switch means responsive to outdoor temperature for connecting said third element into said bridge in place of said second element when said outdoor temperature falls below said critical value.

33. In a condition control system, a condition changing device, a first resistance element whose specific resistance changes in accordance with the magnitude of a main controlling condition, a second resistance element whose specific resistance changes over an unlimited range with changes in the magnitude of a second controlling condition, means including both said resistance elements for controlling said condition changing device, and means automatically operative whenever said second condition is within a predetermined range of values to prevent said condition changing device from being affected by variations in the resistance value of said second resistance element without affecting the controlling effect of said first resistance element.

34. In temperature controlling apparatus, a control device for a temperature changing means, a first resistance element having a relatively high temperature coefficient of resistance and exposed to the temperature of a space whose temperature is to be controlled, a second resistance element also having a relatively high temperature coefficient of resistance and exposed to the temperature of a medium whose temperature affects the temperature of said space, means including both said resistance elements for controlling said control device, and means automatically operative whenever the temperature of said medium is within a predetermined range of values to prevent said control device from being affected by variations in the resistance value of said second resistance element without affecting the controlling effect of said first resistance element.

35. In temperature controlling apparatus, a control device for a cooling means, a first resistance element having a relatively high temperature coefficient of resistance and exposed to the temperature of a space whose temperature is to be controlled, a second resistance element also having a relatively high temperature coefficient of resistance and exposed to the temperature outside of said space, means including both said resistance elements for controlling said control device, and means automatically operative whenever the outside temperature is below a predetermined value to prevent said control device from being affected by variations in the resistance value of said second resistance element without affecting the controlling effect of said first resistance element.

36. In electronic condition control apparatus, a control device for condition changing apparatus, an impedance bridge including an impedance element whose impedance changes with the magnitude of a controlling condition, an electronic amplifier having input terminals and output terminals, transformer means including a secondary winding for applying an alternating voltage to said bridge and a biasing secondary winding, means for applying in series to the input terminals of said amplifier an alternating voltage varying in magnitude and phase with the unbalance of said bridge and the output voltage of said biasing secondary winding, and means associated with the output terminals of said amplifier for controlling the operation of said control device.

37. In a temperature control system for a space, temperature changing means, control means for varying the temperature changing effect of said temperature changing means, and means including a resistance network for controlling said control means, said resistance network comprising a first resistor exposed to the temperature of said space having an appreciable temperature coefficient of resistance, a second resistor exposed to a second temperature condition and also hav'ng an appreciable temperature coefficient of resistance, and means associated with said second resistor and controlling the effect of said second resistor on the unbalance of the resistance network, said last named means including a movable contact member electrically connected to said second resistor and a thermosensitive element exposed to said second temperature condition and controlling the position of said movable contact member.

38. In a temperature control system for a space, temperature changing means, control means for varying the temperature changing effect of said temperature changing means, and means including a resistance network for controlling said control means, said resistance network comprising a first resistor exposed to the tempertaure of said space having an appreciable temperature coefficient of resistance, a second resistor exposed to the temperature outside of said space and also having an appreciable temperature coefficient of resistance, and means associated with said second resistor and controlling the effect of said second resistor on the unbalance of the resistance network, said last named means including a third resistor having a negligible temperature coefficient of resistance, a movable contact member electrically associated with said second and third resistors and a thermosensitive element exposed to said temperature outside of said space and controlling the position of said movable contact member.

39. In a temperature control system for a space, temperature changing means, control means for varying the temperature changing effect of said temperature changing means, and means including a resistance network for controlling said control means, said resistance network comprising a first resistor exposed to the temperature of said space having an appreciable temperature coefficient of resistance, a second resistor exposed to the temperature outside of said space and also having an appreciable temperature coefficient of resistance, and means associated with said second resistor and controlling the effect of said second resistor on the unbalance of the resistance network, said last named means including a movable contact member electrically connected to said second resistor and a thermosensitive element exposed to said temperature outside of said space and controlling the position of said movable contact member, said contact member being movable toward and away from a position in which said second resistor has no effect upon the output voltage of said resistance network.

40. A temperature control for heating and cooling apparatus, including in combination a balanced circuit including a pair of branch circuits, one of said branch circuits including a resistor whose resistance is responsive to outdoor temperature and the other branch circuit including a resistor whose resistance is responsive to indoor temperature, said resistors being so disposed in said circuit as to have opposite unbalancing effects on said circuit upon an increase in their temperature, and means responsive to the extent and direction of unbalance of said circuit caused by changes in the resistance of said resistors for controlling the heating and cooling apparatus, and means effective whenever the outdoor temperature is sufficiently low to cause the heating apparatus to be operated to cause said last named means to operate independently of said resistor responsive to outdoor temperature.

41. In a condition control system, a condition changing device, means including an electronic amplifier for controlling the operation of said condition changing device, a first resistance element whose specific resistance varies in accordance with the magnitude of a main controlling condition, a second resistance element whose specific resistance changes over an unlimited range with changes in the magnitude of a second controlling condition, means including said first resistance element for applying an input voltage to said amplifier dependent in magnitude on the resistance value of said first resistance element and means including said second resistance element for modifying said input voltage in accordance with the value of said second condition, said last named means including a current controlling device which is ineffective to conduct current whenever said condition is within a predetermined range of values.

MAURICE R. EASTIN.